(12) United States Patent
Hewitt

(10) Patent No.: US 11,989,521 B2
(45) Date of Patent: *May 21, 2024

(54) NATURAL LANGUAGE PROCESSING WITH NON-ONTOLOGICAL HIERARCHY MODELS

(71) Applicant: Verint Americas Inc., Alpharetta, GA (US)

(72) Inventor: Timothy James Hewitt, Spokane Valley, WA (US)

(73) Assignee: Verint Americas Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,701

(22) Filed: Jan. 24, 2022

(65) Prior Publication Data

US 2022/0253606 A1    Aug. 11, 2022

Related U.S. Application Data

(63) Continuation of application No. 16/657,550, filed on Oct. 18, 2019, now Pat. No. 11,232,264.

(60) Provisional application No. 62/747,845, filed on Oct. 19, 2018.

(51) Int. Cl.
*G06F 40/30* (2020.01)
*G06F 17/18* (2006.01)
*G06F 40/205* (2020.01)

(52) U.S. Cl.
CPC .............. *G06F 40/30* (2020.01); *G06F 17/18* (2013.01)

(58) Field of Classification Search
CPC ....................................................... G06F 40/30
See application file for complete search history.

(56) References Cited

U.S. PATENT DOCUMENTS

| 4,914,590 A | 4/1990 | Loatman et al. |
| 5,278,980 A | 1/1994 | Pedersen et al. |
| 5,418,948 A | 5/1995 | Turtle |
| 5,535,120 A | 7/1996 | Chong et al. |
| 5,615,112 A | 3/1997 | Liu Sheng et al. |
| 5,677,835 A | 10/1997 | Carbonell et al. |
| 5,682,539 A | 10/1997 | Conrad et al. |
| 5,727,174 A | 3/1998 | Aparicio et al. |

(Continued)

FOREIGN PATENT DOCUMENTS

| CN | 103051669 | 4/2013 |
| WO | 2011/088053 | 7/2011 |
| WO | 2017/127321 | 7/2017 |

OTHER PUBLICATIONS

Powers, David MW. "Neurolinguistics and psycholinguistics as a basis for computer acquisition of natural language." ACM SIGART Bulletin 84 (1983): 29-34. (Year: 1983).*

(Continued)

*Primary Examiner* — Jialong He
(74) *Attorney, Agent, or Firm* — Meunier Carlin & Curfman LLC

(57) ABSTRACT

A non-ontological hierarchy for language models is based on established psycholinguistic and neuro-linguistic evidences. By using non-ontological hierarchies, a more natural understanding of user's inputs and intents improve toward a better potential for producing intelligent responses in a conversational situation.

6 Claims, 3 Drawing Sheets

(56) References Cited

U.S. PATENT DOCUMENTS

| | | | |
|---|---|---|---|
| 5,794,050 A * | 8/1998 | Dahlgren | G06F 40/216 |
| | | | 717/149 |
| 6,012,053 A | 1/2000 | Pant et al. | |
| 6,112,177 A | 8/2000 | Cosatto et al. | |
| 6,144,938 A | 11/2000 | Surace et al. | |
| 6,175,829 B1 | 1/2001 | Li et al. | |
| 6,282,507 B1 | 8/2001 | Horiguchi et al. | |
| 6,285,978 B1 | 9/2001 | Bernth et al. | |
| 6,353,817 B1 | 3/2002 | Jacobs et al. | |
| 6,388,665 B1 | 5/2002 | Linnett et al. | |
| 6,396,951 B1 | 5/2002 | Grefenstette | |
| 6,401,061 B1 | 6/2002 | Zieman | |
| 6,513,063 B1 | 1/2003 | Julia et al. | |
| 6,658,627 B1 | 12/2003 | Gallup et al. | |
| 6,661,418 B1 | 12/2003 | McMillan et al. | |
| 6,757,362 B1 | 6/2004 | Cooper et al. | |
| 6,826,540 B1 | 11/2004 | Plantec et al. | |
| 6,829,603 B1 | 12/2004 | Chai et al. | |
| 6,834,120 B1 | 12/2004 | LeClerc et al. | |
| 6,987,514 B1 | 1/2006 | Beresin et al. | |
| 6,999,932 B1 | 2/2006 | Zhou | |
| 7,058,902 B2 | 6/2006 | Iwema et al. | |
| 7,076,430 B1 | 7/2006 | Cosatto et al. | |
| 7,194,483 B1 | 3/2007 | Mohan et al. | |
| 7,263,493 B1 | 8/2007 | Provost et al. | |
| 7,337,158 B2 | 2/2008 | Fratkina et al. | |
| 7,426,697 B2 | 9/2008 | Holecek et al. | |
| 7,483,829 B2 | 1/2009 | Murakami et al. | |
| 7,536,413 B1 | 5/2009 | Mohan et al. | |
| 7,539,656 B2 | 5/2009 | Fratkina et al. | |
| 7,548,899 B1 | 6/2009 | Del Favero et al. | |
| 7,558,792 B2 | 7/2009 | Bier | |
| 7,590,224 B1 | 9/2009 | Gorin et al. | |
| 7,599,831 B2 | 10/2009 | Ford | |
| 7,610,382 B1 | 10/2009 | Siegel | |
| 7,711,547 B2 | 5/2010 | Abir | |
| 7,739,604 B1 | 6/2010 | Lyons et al. | |
| 7,797,146 B2 | 9/2010 | Harless et al. | |
| 7,818,183 B2 | 10/2010 | Schoenberg | |
| 7,912,701 B1 | 3/2011 | Gray et al. | |
| 7,970,663 B2 | 6/2011 | Ganz et al. | |
| 8,160,979 B1 | 4/2012 | Evans et al. | |
| 8,346,563 B1 | 1/2013 | Hjelm et al. | |
| 8,352,266 B2 | 1/2013 | Farmaner et al. | |
| 8,401,842 B1 | 3/2013 | Ginzburg et al. | |
| 8,433,556 B2 | 4/2013 | Fraser et al. | |
| 8,468,122 B2 | 6/2013 | Tunstall-Pedoe | |
| 8,473,420 B2 | 6/2013 | Bohus | |
| 8,510,276 B2 | 8/2013 | Haiby et al. | |
| 8,519,963 B2 | 8/2013 | Kocienda et al. | |
| 8,666,928 B2 | 3/2014 | Tunstall-Pedoe | |
| 8,670,979 B2 | 3/2014 | Gruber et al. | |
| 8,677,377 B2 | 3/2014 | Cheyer et al. | |
| 8,731,929 B2 | 5/2014 | Kennewick et al. | |
| 8,756,326 B1 | 6/2014 | Elberse et al. | |
| 8,762,152 B2 | 6/2014 | Bennett et al. | |
| 8,819,003 B2 | 8/2014 | Anick et al. | |
| 8,930,191 B2 | 1/2015 | Gruber et al. | |
| 8,942,986 B2 | 1/2015 | Cheyer et al. | |
| 8,943,094 B2 | 1/2015 | Brown et al. | |
| 9,117,447 B2 | 8/2015 | Gruber et al. | |
| 9,202,171 B2 | 12/2015 | Kuhn | |
| 9,501,741 B2 | 11/2016 | Cheyer et al. | |
| 2001/0000356 A1 | 4/2001 | Woods | |
| 2001/0033298 A1 | 10/2001 | Slotznick | |
| 2001/0044751 A1 | 11/2001 | Pugliese et al. | |
| 2001/0049688 A1 | 12/2001 | Fratkina et al. | |
| 2001/0053968 A1 | 12/2001 | Galitsky et al. | |
| 2002/0008716 A1 | 1/2002 | Colburn et al. | |
| 2002/0032564 A1 | 3/2002 | Ehsani | |
| 2002/0032591 A1 | 3/2002 | Mahaffy et al. | |
| 2002/0123994 A1 | 9/2002 | Schabes et al. | |
| 2002/0129031 A1 | 9/2002 | Lau et al. | |
| 2002/0198885 A1 | 12/2002 | Streepy | |
| 2003/0004908 A1 | 1/2003 | Linthicum et al. | |
| 2003/0041307 A1 | 2/2003 | Park | |
| 2003/0061029 A1 | 3/2003 | Shaket | |
| 2003/0088547 A1 | 5/2003 | Hammond | |
| 2003/0126089 A1 | 7/2003 | Fukuoka et al. | |
| 2003/0126090 A1 | 7/2003 | Fukuoka et al. | |
| 2003/0142829 A1 | 7/2003 | Avigni | |
| 2003/0212544 A1 | 11/2003 | Acero et al. | |
| 2003/0216919 A1 | 11/2003 | Roushar | |
| 2004/0107088 A1 | 6/2004 | Budzinski | |
| 2004/0141013 A1 | 7/2004 | Alcazar et al. | |
| 2004/0186705 A1 | 9/2004 | Morgan et al. | |
| 2005/0027694 A1 | 2/2005 | Sauermann | |
| 2005/0054381 A1 | 3/2005 | Lee et al. | |
| 2005/0120276 A1 | 6/2005 | Kolawa et al. | |
| 2006/0004826 A1 | 1/2006 | Zartler et al. | |
| 2006/0020466 A1 | 1/2006 | Cousineau et al. | |
| 2006/0036430 A1 | 2/2006 | Hu | |
| 2006/0037076 A1 | 2/2006 | Roy | |
| 2006/0047632 A1 | 3/2006 | Zhang | |
| 2006/0067352 A1 | 3/2006 | John et al. | |
| 2006/0074689 A1 | 4/2006 | Cosatto et al. | |
| 2006/0074831 A1 | 4/2006 | Hyder et al. | |
| 2006/0080107 A1 | 4/2006 | Hill et al. | |
| 2006/0092978 A1 | 5/2006 | John et al. | |
| 2006/0161414 A1 | 7/2006 | Carignano et al. | |
| 2006/0206483 A1 | 9/2006 | Knepper et al. | |
| 2006/0253427 A1 | 11/2006 | Wu | |
| 2007/0043687 A1 | 2/2007 | Bodart et al. | |
| 2007/0100790 A1 | 5/2007 | Cheyer et al. | |
| 2007/0106670 A1 | 5/2007 | Yoakum et al. | |
| 2007/0130112 A1 | 6/2007 | Lin | |
| 2007/0134631 A1 | 6/2007 | Hardy et al. | |
| 2007/0156677 A1 | 7/2007 | Szabo | |
| 2007/0185702 A1 | 8/2007 | Harney et al. | |
| 2007/0197296 A1 | 8/2007 | Lee | |
| 2007/0242656 A1 | 10/2007 | Klassen et al. | |
| 2007/0265533 A1 | 11/2007 | Tran | |
| 2007/0294229 A1 | 12/2007 | Au | |
| 2008/0005158 A1 | 1/2008 | Zartler et al. | |
| 2008/0010268 A1 | 1/2008 | Liao et al. | |
| 2008/0016040 A1 | 1/2008 | Jones et al. | |
| 2008/0036756 A1 | 2/2008 | Gaos et al. | |
| 2008/0091406 A1 | 4/2008 | Baldwin et al. | |
| 2008/0096533 A1 | 4/2008 | Manfredi et al. | |
| 2008/0133444 A1 | 6/2008 | Gao et al. | |
| 2008/0162498 A1 | 7/2008 | Omoigui | |
| 2008/0177538 A1 * | 7/2008 | Roy | G10L 15/26 |
| | | | 704/235 |
| 2008/0222734 A1 | 9/2008 | Redlich et al. | |
| 2008/0228467 A1 | 9/2008 | Womack et al. | |
| 2008/0235604 A1 | 9/2008 | Eber | |
| 2008/0275694 A1 | 11/2008 | Varone | |
| 2008/0305815 A1 | 12/2008 | McDonough | |
| 2009/0006525 A1 | 1/2009 | Moore | |
| 2009/0030800 A1 | 1/2009 | Grois | |
| 2009/0063427 A1 | 3/2009 | Zuta et al. | |
| 2009/0070099 A1 | 3/2009 | Anisimovich | |
| 2009/0070103 A1 | 3/2009 | Beggelman et al. | |
| 2009/0077488 A1 | 3/2009 | Ording | |
| 2009/0089100 A1 | 4/2009 | Nenov et al. | |
| 2009/0119095 A1 | 5/2009 | Beggelman | |
| 2009/0119587 A1 | 5/2009 | Allen | |
| 2009/0157386 A1 | 6/2009 | Zhou | |
| 2009/0171923 A1 | 7/2009 | Nash et al. | |
| 2009/0182702 A1 | 7/2009 | Miller | |
| 2009/0204677 A1 | 8/2009 | Michaelis et al. | |
| 2009/0216691 A1 | 8/2009 | Borzestowski et al. | |
| 2009/0225041 A1 | 9/2009 | Kida et al. | |
| 2009/0227223 A1 | 9/2009 | Jenkins | |
| 2009/0228264 A1 | 9/2009 | Williams et al. | |
| 2009/0235356 A1 | 9/2009 | Jensen et al. | |
| 2009/0248399 A1 | 10/2009 | Au | |
| 2009/0271205 A1 | 10/2009 | Finn et al. | |
| 2010/0005122 A1 | 1/2010 | Jackson | |
| 2010/0030549 A1 | 2/2010 | Lee et al. | |
| 2010/0050237 A1 | 2/2010 | Bokor et al. | |
| 2010/0070448 A1 | 3/2010 | Omoigui | |
| 2010/0070871 A1 | 3/2010 | Liesche | |
| 2010/0153398 A1 | 6/2010 | Miller et al. | |

(56) References Cited

U.S. PATENT DOCUMENTS

| | | |
|---|---|---|
| 2010/0169336 A1 | 7/2010 | Eckhoff-Hornback et al. |
| 2010/0226490 A1 | 9/2010 | Schultz et al. |
| 2010/0235808 A1 | 9/2010 | Dayan et al. |
| 2010/0281012 A1 | 11/2010 | Imig |
| 2010/0312547 A1 | 12/2010 | Van Os et al. |
| 2011/0004841 A1 | 1/2011 | Gildred et al. |
| 2011/0071819 A1 | 3/2011 | Miller et al. |
| 2011/0078105 A1 | 3/2011 | Wallace |
| 2011/0119196 A1 | 5/2011 | Ventura |
| 2011/0179126 A1 | 7/2011 | Wetherell et al. |
| 2011/0213642 A1 | 9/2011 | Makar et al. |
| 2011/0282664 A1 | 11/2011 | Tanioka et al. |
| 2011/0288947 A1 | 11/2011 | Biran |
| 2011/0301982 A1 | 12/2011 | Green et al. |
| 2011/0307245 A1 | 12/2011 | Hanneman et al. |
| 2012/0016678 A1 | 1/2012 | Gruber et al. |
| 2012/0022872 A1 | 1/2012 | Gruber et al. |
| 2012/0030553 A1 | 2/2012 | Delpha et al. |
| 2012/0041903 A1 | 2/2012 | Beilby et al. |
| 2012/0078891 A1 | 3/2012 | Brown et al. |
| 2012/0110473 A1 | 5/2012 | Tseng |
| 2012/0117005 A1 | 5/2012 | Spivack |
| 2012/0221502 A1 | 8/2012 | Jerram et al. |
| 2012/0233188 A1* | 9/2012 | Majumdar ............. G06F 16/355 707/756 |
| 2012/0245926 A1 | 9/2012 | Montyne et al. |
| 2012/0253825 A1 | 10/2012 | Di Fabbrizio |
| 2012/0265528 A1 | 10/2012 | Gruber et al. |
| 2012/0266093 A1 | 10/2012 | Park et al. |
| 2012/0284040 A1 | 11/2012 | Dupin |
| 2012/0311541 A1 | 12/2012 | Bullard et al. |
| 2013/0017523 A1 | 1/2013 | Barborak |
| 2013/0031476 A1 | 1/2013 | Coin et al. |
| 2013/0046149 A1 | 2/2013 | Gettelman et al. |
| 2013/0117713 A1 | 5/2013 | Bauder et al. |
| 2013/0152092 A1 | 6/2013 | Yadgar |
| 2013/0204813 A1 | 8/2013 | Master et al. |
| 2013/0254139 A1 | 9/2013 | Lei |
| 2013/0258040 A1 | 10/2013 | Kaytaz et al. |
| 2013/0262467 A1 | 10/2013 | Zhang et al. |
| 2013/0275875 A1 | 10/2013 | Gruber et al. |
| 2013/0283168 A1 | 10/2013 | Brown et al. |
| 2014/0029734 A1 | 1/2014 | Kim et al. |
| 2014/0032574 A1* | 1/2014 | Khan ................. G06F 16/3331 707/754 |
| 2014/0040748 A1 | 2/2014 | Lemay et al. |
| 2014/0047001 A1 | 2/2014 | Phillips et al. |
| 2014/0053102 A1 | 2/2014 | Lee et al. |
| 2014/0074454 A1 | 3/2014 | Brown |
| 2014/0095147 A1 | 4/2014 | Hebert et al. |
| 2014/0098948 A1 | 4/2014 | Kulkarni et al. |
| 2014/0115456 A1 | 4/2014 | White et al. |
| 2014/0163959 A1 | 6/2014 | Hebert et al. |
| 2014/0164476 A1 | 6/2014 | Thomson |
| 2014/0164508 A1 | 6/2014 | Lynch et al. |
| 2014/0181741 A1 | 6/2014 | Apacible et al. |
| 2014/0195926 A1 | 7/2014 | Hussain |
| 2014/0201675 A1 | 7/2014 | Joo et al. |
| 2014/0244266 A1 | 8/2014 | Brown et al. |
| 2014/0244712 A1 | 8/2014 | Walters et al. |
| 2014/0245140 A1 | 8/2014 | Brown et al. |
| 2014/0270109 A1 | 9/2014 | Riahl et al. |
| 2014/0280490 A1 | 9/2014 | Artun |
| 2014/0282109 A1 | 9/2014 | Wenger et al. |
| 2014/0297284 A1 | 10/2014 | Gruber et al. |
| 2014/0310005 A1 | 10/2014 | Brown et al. |
| 2014/0317502 A1 | 10/2014 | Brown et al. |
| 2014/0337048 A1 | 11/2014 | Brown et al. |
| 2014/0337306 A1 | 11/2014 | Gramatica |
| 2014/0343924 A1 | 11/2014 | Brown et al. |
| 2014/0343928 A1 | 11/2014 | Brown et al. |
| 2014/0365223 A1 | 12/2014 | Brown et al. |
| 2014/0365407 A1 | 12/2014 | Brown et al. |
| 2015/0066817 A1 | 3/2015 | Slayton et al. |
| 2015/0185996 A1 | 7/2015 | Brown et al. |
| 2015/0186154 A1 | 7/2015 | Brown et al. |
| 2015/0186155 A1 | 7/2015 | Brown et al. |
| 2015/0186156 A1 | 7/2015 | Brown et al. |
| 2015/0331854 A1 | 11/2015 | Alshinnawi et al. |
| 2015/0332168 A1* | 11/2015 | Bhagwat ............... G06F 3/0481 706/12 |
| 2015/0339290 A1* | 11/2015 | Mueller .................. G06F 40/40 704/9 |
| 2015/0363697 A1 | 12/2015 | Spivack |
| 2016/0012186 A1 | 1/2016 | Zasowski et al. |
| 2016/0098387 A1* | 4/2016 | Bruno ..................... G06F 40/30 704/9 |
| 2016/0110071 A1 | 4/2016 | Brown et al. |
| 2016/0132291 A1 | 5/2016 | Bai et al. |
| 2016/0321347 A1* | 11/2016 | Zhou .................. G06Q 30/0623 |
| 2017/0032027 A1 | 2/2017 | Mauro et al. |
| 2017/0060994 A1* | 3/2017 | Byron ................. G06F 16/3344 |
| 2017/0116985 A1 | 4/2017 | Mathias |
| 2017/0132220 A1 | 5/2017 | Brown et al. |
| 2017/0223124 A1* | 8/2017 | Dhawan ............... H04N 19/436 |
| 2017/0277993 A1 | 9/2017 | Beaver et al. |
| 2017/0357637 A1 | 12/2017 | Nell et al. |
| 2019/0057698 A1 | 2/2019 | Raanani et al. |

OTHER PUBLICATIONS

Arbib, Michael A., and David Caplan. "Neurolinguistics must be computational." Behavioral and Brain Sciences 2.3 (1979): 449-460. (Year: 1979).*

Kitamura, Yoshinobu, and Riichiro Mizoguchi. "Functional ontology for functional understanding." Twelfth International Workshop on Qualitative Reasoning (QR-98), Cape Cod, USA, AAAI Press. 1998. (Year: 1998).*

"5 wearable electronic phones", retrieved on Feb. 13, 2015 at http://limcorp.net/2009/5-wearable-electronic-phones, 2015, 12 pages.

Bhaskar, J., et al., "Hybrid Approach for Emotion Classification of Audio Conversation Based on Text and Speech Mining," International Conference on Information and Communication Technologies (ICICT 2014), Procedia Computer Science, vol. 46, 2015, pp. 635-643.

Brill, E., "Transformation-Based Error-Driven Learning and Natural Language Processing: A Case Study in Part-of-Speech Tagging," Association for Computational Linguistics, 1995, 24 pages.

Cassell, J., et al., "Embodied Conversational Agents," MIT Press, 2000, pp. 272 and 275.

Davies, M., "The Corpus of Contemporary American English as the first reliable monitor corpus of English," Literary and Linguistic Computing, vol. 25, No. 4, 2010, pp. 447-464.

Dumoulin, J., "Using Multiple Classifiers to Improve Intent Recognition in Human Chats," MAICS, 2014, 6 pages.

"Frost & Sullivan Commends Next IT for Leading the Virtual Agent Applications Industry in Competitive Strategy Innovation," Frost & Sullivan, 2014, 5 pages.

Guzzoni, D., et al., "Modeling Human-Agent Interaction with Active Ontologies," Spring 2007 AAAI Symposium, 2007, 8 pages.

Kim, Y-B., et al., "*Onenet*: Joint Domain, Intent, Slot Prediction for Spoken Language Understanding," IEEE Automatic Speech Recognition and Understanding Workshop (ASRU), 2017, 7 pages.

Kim, B., et al., "Two-stage multi-intent detection for spoken language understanding," Multimedia Tools and Applications, 2016, 14 pages.

Krahmer, E., et al., "Problem Spotting in Human-Machine Interaction," IPO, Center for Research on User-System Interaction, Sixth European Conference on Speech Communication and Technology, 1999, 4 pages.

Kuhn, R., et al., "The Application of Semantic Classification Trees to Natural Language Understanding," IEEE Transactions on Pattern Analysis and Machine Intelligence, vol. 17, No. 5, 1995, pp. 449-460.

Langkilde, I., et al., "Automatic Prediction of Problematic Human-Computer Dialogues in How May I Help You?," AT&T Labs Research, 1999, 5 pages.

(56) References Cited

OTHER PUBLICATIONS

Lison, P., "Structured Probabilistic Modelling for Dialogue Management," Ph.D. Thesis, Department of Informatics, Faculty of Mathematics and Natural Sciences, University of Oslo, Oct. 30, 2013, 250 pages.

"Meet Jenn, Your Virtual Assistant at alaskaair.com," retrieved on Apr. 13, 2015 at http://www.alaskaair.com/content/about-us/site-info/ask-jenn.aspx, 2015, 1 page.

"Meet Julia—TAM Airlines' most famous new hire," Case Study, Next IT Corporation, 2015, 2 pages.

Ratnaparkhi, A., "A Maximum Entropy Model for Part-of-Speech Tagging," Conference on Empirical Methods in Natural Language Processing (EMNLP), 1996, 10 pages.

Rosch, E., et al., "Principles of Categorization," Cognition and Categorization, 1978, pp. 27-48.

"SGT STAR Wins Intelligent Assistant Award," PRWEB, 2014, 2 pages.

"The Army's Robot Recruiter," Transcript from New York Public Radio, retrieved on Jan. 20, 2015 at http://www.onthemedia.org/story/armys-robot-recruiter-aug/transcript, 2014, 3 pages.

Towell, G., et al., Knowledge-Based Artificial Neural Networks, Artificial Intelligence, vols. 69/70, 1994, 29 pages.

Walker, M., et al., "Learning to Predict Problematic Situations in a Spoken Dialogue System: Experiments with How May I Help You?," AT&T Labs Research, NAACL 2000 Proceedings of the 1st North American chapter of the Association for Computational Linguistics conference, 2000, 8 pages.

Wikipedia page "CALO," retrieved on Nov. 15, 2017 at https://en.wikipedia.org/wiki/CALO, 2017, 5 pages.

"With Alme, Alaska Airlines soars", Case Study, retrieved on Apr. 10, 2015 at http://www.nextit.com/media/downloads/Case-study-Alaska-Air.pdf, 2015, 3 pages.

\* cited by examiner

NATURAL LANGUAGE PROCESSING WITH NON-ONTOLOGICAL HIERARCHY MODELS

CROSS REFERENCE TO RELATED PATENT APPLICATIONS

This application claims priority to Unites States Provisional Patent Application Ser. No. 62/747,845 filed on Oct. 19, 2018, which is incorporated by reference herein.

FIELD OF THE INVENTION

The invention relates to computerized natural language processing systems for user interfaces accommodating human-machine conversations such as voice activated commands, virtual assistant operations, artificial intelligence training, and the like.

BACKGROUND

An ontology generally specifies relationships between groups of data that represent respective concepts and can be broad and general or bounded by a particular domain of variables. Ontologies are useful for structuring parent to child hierarchies of things. These kinds of structures, however, are not always truly representative of how the human brain creates or processes relationships. Using a different hierarchy model based on the psycholinguistic phenomenon of prototyping instead of ontologies, a hierarchy language model can achieve a more human-like understanding and production of language.

For purposes herein, this disclosure uses birds as one of the examples. Using the standard scientific taxonomy as a prior art ontology for birds, a bird "is a" chordate and a chordate "is an" animal. Thus a robin, as a bird, "is also a" chordate and an animal. Because of this, a bird is as much as an animal as a cow, and a robin is as much of a bird as a penguin. When asked to name an animal, however, a human does not say bird, and when asked to name a bird, a human does not say ostrich (Rosch 1978). In linguistics and psychology, this phenomenon is called prototyping.

The example above still uses the expression "is a" to connote a relationship, but that is only a weak relationship. One might say that a penguin "is a bird," as demonstrated by a previously known correlation between penguins and birds. For example, both have similar attributes, i.e., both birds and penguins have feathers and beaks and they both lay eggs and build nests. By comparison, however, the connection of robins to birds is made stronger by the fact that both birds and robins have strong connections to FLY, SING, and PERCH, to name a few. These words are not strongly connected to the concept of a penguin. In data processing terms, standard ontologies programmed with parent-child relationships have formed a basis for improving results in computer systems that utilize natural language processing and artificial intelligence from natural language inputs. The improved results are directly related to identifying Boolean relationships among natural language inputs from either a human or machine user. This disclosure, however, presents a system and method to steer the automated/computerized decision making in a broader direction that is not strictly subject to pre-programmed Boolean logic ontologies. Instead, the systems and methods discussed in this disclosure utilizes prototyping to represent concepts that are decipherable from not only simple syntax and but also from broader concepts distinguishable by semantic analysis of a natural language input.

Prototyping as noted herein is prevalent in numerous every day language processing. For example, this prototyping can be shown in one test case related to the general concepts in diet. Chickens are defined as birds, but there is a disconnection because people eat chickens, but people do not eat birds. People, especially children, have a disconnect between the meat they eat and the animal they see, e.g., humans eat beef. But humans do not immediately process the word beef with the concept of eating cows, as the language goes.

A need exists, therefore, for modeling out this prototyping for the purposes of natural language processing (NLP) to allow for a more dynamic application without having to define strict and sometimes artificial ontologies to demonstrate relationships. Also, the relationships become much more fluid than the strict parent to child Boolean relationships.

DETAILED DESCRIPTION

Figure 1:
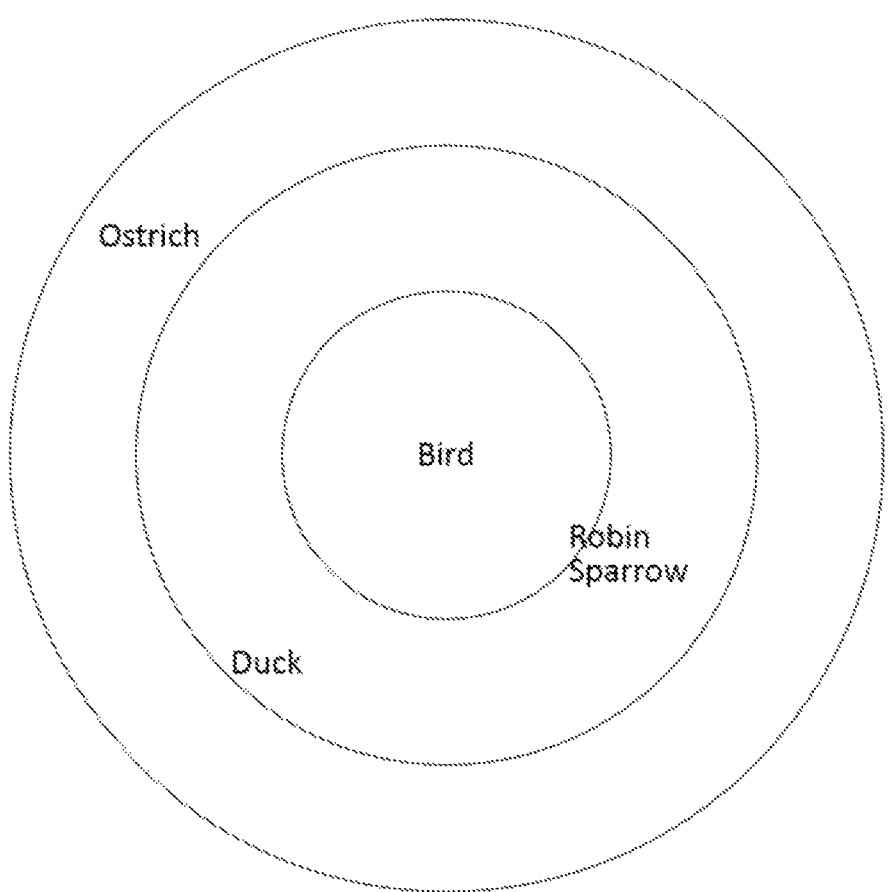
FIG. 1 is an example of a non-ontology of birds. Centrality is a measure of generic terms. The center is the most generic term. This diagram is meant to demonstrate that robins are more closely related to birds than ostriches. It also shows that ostriches, while birds, have little similarity to robins.
Figure 2:
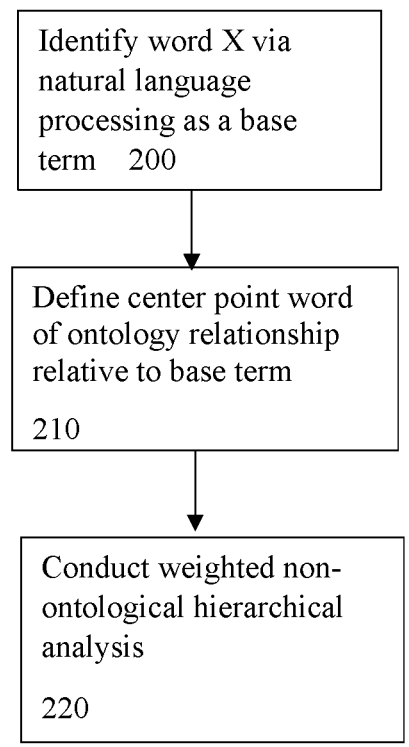
FIG. 2 is a flow chart of a non-ontological system according to this disclosure.
Figure 3:
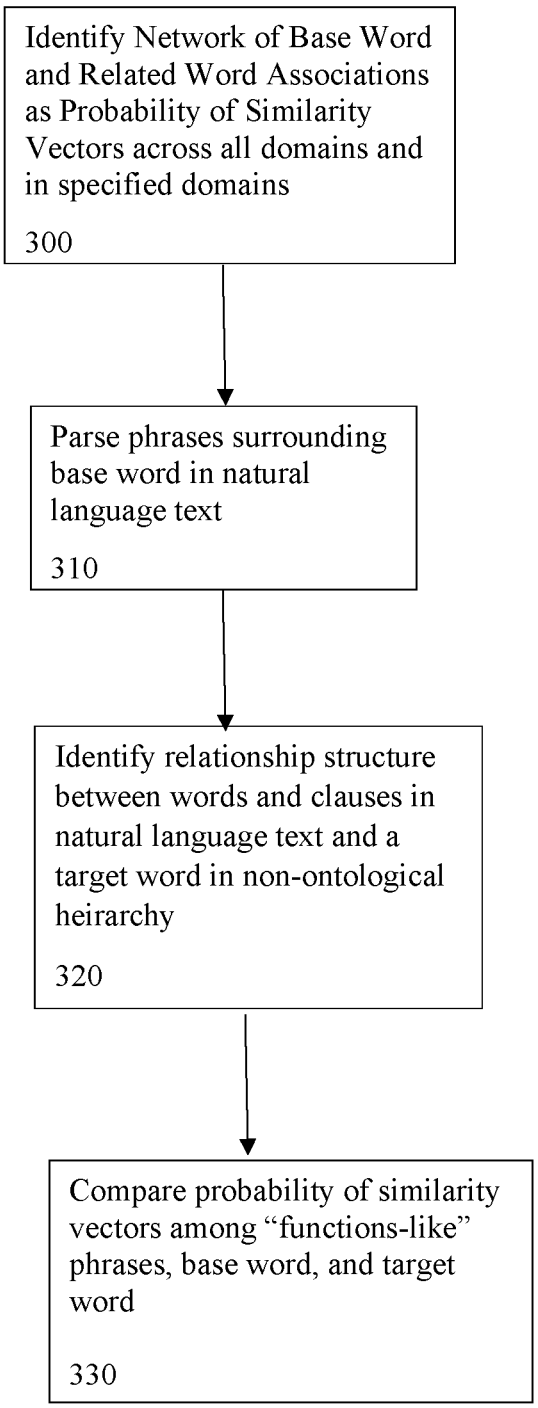
FIG. 3 is a flow chart of a non-ontological system according to this disclosure.

What is hoped is that as relationships are more defined, a pseudo-semantic idea would present on its own in a non-ontological model for natural language processing, or "NLP." The phrase, "throwing a ball," for example, can mean several different things—a toy or an extravagant formal dance. But conversational awareness of the previous or later main verbs, subjects, and objects and computing how these inputs function in the broader context that a user presents as input could further define what kind of ball was thrown.

Also, given this method, a version of the experiential parser may be able to get rid of parts of speech dependencies in natural language processing models and might be able to move to a more realistic abstraction of function which is more independently defined. Instead of the artificial definitions of noun and verb that must be previously defined for tagging an input data stream from a user, the concepts described in this disclosure can create a 'functions-like' relationship definition based on the "action+object," "subject+action," etc. identifications as opposed to the above noted prior art that relies upon the expression "is a" to connote a more traditional parent-child or Boolean relationship between input terms.

Returning to the example, the term "robin," when looking at the data, functions like a bird. Therefore, robin should be of the same functional group as bird which can also fit into the same but broader functional group as all other things that "eat." In this example, as inputs are entered and semantics are considered, the functional groups are self-defining. Essentially, when functional groups can be self-defining, the non-ontological hierarchies for natural language processing eliminates the need for part of speech tagging or reliance.

In order to accomplish these goals, a network of associations 200 would need to exist. In the short term, this disclosure would define non-ontological relationships within natural language inputs as follows with more definitions added as needed. There will likely need to be weights added to these associations, but further research would need to be applied to define what those weights would need to be.

| aX | BE | bY |
| aX | HAVE | bY |
| X | modified-by | bY | aX (action+object|subject+action|subject+object) bY
bY (action|subject|object) aX
previous clause C (action+object|subject+action|subject+object) D
previous clause D (action|subject|object) C
next clause C (action+object|subject+action|subject+object) D
next clause D (action|subject|object) C Using the example of robins, the relationships could be modeled as:

| robin BE bird | | |
| --- | --- | --- |
| Relationship points | robin | bird |
| HAVE | feather | feather |
| HAVE | beak | beak |
| HAVE | wing | wing |
| HAVE | red breast | |
| modified-by | red breasted | |
| modified-by | brown | brown |
| modified-by | | blue |
| action | fly | fly |
| 1 action + object | eat \| worms | eat \| worms |
| 1 action + object | build \| nests | build \| nests |
| 2 subject + action | cat \| eat | cat \| eat |

Looking at shared features, this would return that robin is a good prototype bird. The result is determined not by Boolean logic, prior tagging of certain parts of speech, or specific parent-child hierarchies, but instead the appropriate natural language input can be deciphered, and relationships in the natural language may be identified, in terms of broader functional categories resulting from both syntactical and semantical analyses of functions accomplished by discrete kinds of input.

By this, bugs would be a good prototype for insect and insect would be a good prototype for bug, explaining their interchangeability in language. If one takes into account that spider is also a good prototype for bug, it would also explain why some people refer to spiders as insects, even though it's not correct taxonomy.

Each of these points is not separate. They are connected one to another as well as to the root term. As these connections get stronger or weaker, semantic differences should start to surface.

Also, given this method, a version of the experiential parser may be able to get rid of part-of-speech dependencies and might be able to move to a more realistic abstraction of function which is more independently defined. Instead of the artificial definitions of noun and verb, we can create a 'functions-like' relationship definition based on the action+object, etc. definitions. Robin, when looking at the data, functions like a bird. Therefore, robin should be of the same functional group as bird which should fit into the same functional group as all other "things that eat" if the functional groups are self-defining.

Creating the Hierarchy

In building out the table above, there would be a statistical measure of relationship between functional items within a natural language input, along with potential domain metrics between base term and related terms in the defined relationship. Those would create probability vectors for the base term in all domains and in specified domains. Accordingly, a raw comparison of collocate structures should give similar terms. Comparing those relationships will give a similarity vector per defined domain/context. It would be relatively pointless to try to compare every word to every other word indiscriminately. It would be better to wait until there is a reason to suspect similarity, such as modified by same terms or modifying the same term.

The preferred method of defining which is the more generic term would be accomplished through evidence in language. Continuing the example, this would be done between robin and bird, by inferring from the aX BE bY, i.e. robins are birds or some birds are robins. Where language does not exist, the hierarchical relationship can and should be manually defined.

Where there is no such hierarchy relationship, we call it similarity without hierarchy. Similarity without hierarchy can be used to define a relationship that in the terms of ontology would be like siblings an undefined parent. This would indicate the need for a proto-term, but that term is either undefined or does not exist.

In the situation of aX BE bY and bY BE cZ, an automatic hierarchy 210 is created even though the similarity metric may be below whatever threshold is chosen.

The data points necessary for building out non-ontological hierarchies, or non-ontologies, are simple enough to where they should be extractable via controlled automatic methods over readily available corpora.

Data Structure

In order to create non-ontologies, we need to describe a network of associations. A sample of some of these associations are described in Table 1. In building out this table, there would be a statistical measure of relationship, along with potential domain metrics between base term 210 and related terms in the defined relationship 220. Those would create probability vectors 300 for the base term in all domains and in specified domains.

TABLE 1

A sample of association data. Lower case letters indicate modifying term, e.g. payment in payment plan. If a row uses previous clause or next clause all items in that row are applicable to the previous or next clause.

| Base | Relationship | Target |
| --- | --- | --- |
| aB | BE | cD |
| aB | HAVE | eF |
| B | modified-by | gH |
| aB | (action + object\|subject + action\|subject + object) | iJ |
| kL | (action\|subject\|object) | aB |
| previous clause M | (action + object\|subject + action\|subject + object) | N |
| previous clause N | (action\|subject\|object) | M |
| next clause O | (action + object\|subject + action\|subject + object) | P |
| next clause P | (action\|subject\|object) | O |

Method for Extracting Relationships

Automatically creating this dataset with a corpus would rely on some fairly strict n-gram expansion methods or dependency parsers or a combination of both. Examples of structures relating to aB BE cD, would be aB BE cD, some cD BE aB, and cD(plural), like aB, VERB. Examples of structure relating to aB HAVE eF, would be aB HAVE eF, aB's eF, and aB(plural) with eF VERB.

Using a dependency parser to read a corpus and identify and extract these relationships is one possible solution. Another is to use n-gram searches on a part of speech tagged corpus to fill in the slots. Combining the two methods would probably create more reliable results if combining, one probably would not need to first use part of speech tagging in the corpus. If the training corpus has reliable editing standards, most off-the-shelf parsers will be adequate. If relying on a chat-bot corpus, the Experiential Parser is uniquely situated to extract the necessary data from that a-grammatical data. It will probably be important to keep a raw frequency of associations.

Dependency Parser Method

Using a dependency parser 310 to read a corpus, each phrase head has a potential entry B. The other constituents of that phrase that are attached to B are labeled as modifying details a, thus aB. It should be noted that there can multiple aB situations in a single phrase. From there, we look to the other attached roles to see if they match one of our defined structures. If they do, we slot fill in the potential positions. If the positions can't be filled, we move on and don't add the entry to the structure. If it can be moved, all terms are regularized to a root form and added to the structure.

N-Gram Expansion Method

For each term in the corpus, we rely on part of speech tags and tight directional searches to fill the structures. For example, if term B is a noun, in order to find the modifying details, we would look to the left for a noun or an adjective in a very narrow window. If multiples are found, we only consider the highest scoring collocate, thus there is only one aB situation produced. While there are grammatical situations where a prepositional phrase attachment can place modifying details to the right, I believe that the search window for that would be too large to be predictably safe. Each component of the grammatical structures relating to the data structure would also be searched for in a very confined window. We would slot fill as we would for the dependency parser method and regularize to a root before adding to the data structure. To me this is the least predictably accurate method, but better than using a dependency parser on non-grammatical, or a grammatical, language.

Combined Method

Reading the corpus with a dependency parser, we would only pick modifying details that are greater than the average of the positively valued n-gram relationships. The rest of the process would reflect the dependency parser method. This reduces the available aB structures, but the confidence in the value of the assignment would be much greater. Our data structure wouldn't be as cluttered with lower value relationships.

Method for Building the Non-Ontology

Similarity of the distribution of data points is the basis for the non-ontology. A term can be said to be related to another when a comparison of same relationships to same terms shows a similar distribution excluding the aB BE cD relationship which is used to show a so-called centrality (see FIG. 1 fig: birds). While the FIG. 1 shows two dimensions, in truth, this would be a multi-dimensional similarity vector 330 to other terms and to the center.

The aB BE cD relationship is used to show which term(s) are the center points. By definition, only nouns will have centrality, but not all related nouns will have centrality, and the methods disclosed herein avoid forcing a definition for them as that would lead to some of the same artificiality that exists in present ontologies. For example, rocks and balls will probably show some similarity, but one would not expect a common centrality between them. Similar relationships without centrality will be said to have similarity without hierarchy.

The phrasal structures, as defined by rules like aB "action+object" iJ, should give us functional divisions 320 (e.g., "paint" as a noun) and a will be divided along these lines, and the other relationships would not apply once a division is defined. An example of similarity without hierarchy among verbs would be love and hate. In this case it is the previous and next clauses that will create the semantic differentiation point. These terms would show extreme lexical similarity with possibly extreme contextual difference which would indicate an antonym relationship.

Using the Hierarchy

In the input, "A shmoo flew through my window," the system does not know what a "schmoo" is. But it shares an action of flying and a location of "through window." This would be common with several species of birds and bugs. However, we only really want to equate it to the most general that makes sense. We want to stop at birds or insects before we equate it with the too generic category of animal.

However, in certain contexts, like "I saw a stork," given the domain of a zoo, animal may be the more appropriate connection to make. In this case, the domain context for the similarity vectors between bird and animal should decrease to nominal. When such differences are nominal, the system may select the most generic term with a specified degree of confidence.

Once the system has both of those situations, the system can predictably say that a "schmoo" functions like a bird or an insect. This "functions-like" definition is what a non-ontological system can use to replace part-of-speech definitions and tags for natural language inputs.

Still sticking with the bird analogy there are some collocates and contexts that don't make sense. "Flipping the bird" only applies to bird, but none of its children. The context should eventually show that flipping birds applies to a different understanding of the term bird. Once that understanding is differentiated, it creates a new bird meaning— one that is completely separate from robins. In this case, the more specific terms are used to differentiate meaning. Where this hierarchy does not exist, the similarity without hierarchy should be able to be used to make similar distinctions.

Language Model as Whole

Because the non-ontological system described herein contains semantic and syntactic information, in one embodiment, the system may rely upon a syntactic framework, similar to the syntax environments in a related experiential parser, to build upon. The aB BE cD relationship is used to show which term(s) are the center points. By definition, only nouns will have centrality, but not all related nouns will have centrality. Forcing a definition for them will lead to some of the same artificiality that exists in present ontologies. For example, rocks and balls will probably show some similarity, but one would not expect a common centrality between them. Similar relationships without centrality will be said to have similarity without hierarchy. The phrasal structures, as defined by rules like aB action+object iJ, should give us functional divisions, for example paint as a noun and a will be divided along these lines and the other relationships would not apply once a division is defined.

Potential benefits of this system and method include, but are not limited to:

System defines relationships on its own
More fluid, less rigid hierarchies
More human-like understanding of relationships of terms
Hierarchies are less artificial than standard ontologies
Relationships reflect a distance from the central idea rather than a true/false relationship.

This is one of the more fundamental improvements for the next version of a previously submitted experiential parser. The system of this disclosure provides a path to better automated conversations (e.g., if the user is talking about chirping birds, then the system would not begin talking about chickens or vice versa). This disclosure also presents a potential for better mapping of customer knowledge bases along with a potential for better mapping of user experiences.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, network device may be applicable in other exchanges or routing protocols. Moreover, although network device has been illustrated with reference to particular elements and operations that facilitate the communication process, these elements, and operations may be replaced by any suitable architecture or process that achieves the intended functionality of network device.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. The structures shown in the accompanying figures are susceptible to 3-D modeling and can be described relative to vertical, longitudinal and lateral axes established with reference to neighboring components as necessary.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an "application" as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities may be implemented in software provisioned on a networking device. In some embodiments, one or more of these features may be implemented in computer hardware, provided external to these elements, or consolidated in any appropriate manner to achieve the intended functionality. The various network elements may include software (or reciprocating software) that can coordinate image development across domains such as time, amplitude, depths, and various classification measures that detect movement across frames of image data and further detect particular objects in the field of view in order to achieve the operations as outlined herein. In still other embodiments, these elements may include any suitable algorithms, hardware, software, components, modules, interfaces, or objects that facilitate the operations thereof.

Furthermore, computer systems described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that single processor and a single memory element are responsible for certain activities. In a general sense, the arrangements depicted in the Figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory can store data used for the operations described herein. This includes the memory being able to store instructions (e.g., software, logic, code, etc.) in non-transitory media, such that the instructions are executed to carry out the activities described in this Specification. A processor can execute any type of computer readable instructions associated with the data to achieve the operations detailed herein in this Specification. In one example, processors (e.g., processor) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.'

REFERENCES

Rosch, Eleanor, and Barbara Bloom Lloyd, eds. "Cognition and Categorization." (1978).
Davies, Mark. (2008-) The Corpus of Contemporary American English (COCA): 560 million words, 1990-present. Available online at https://corpus.byu.edu/coca/.

The invention claimed is:

1. A computerized system for conducting human-machine conversations, comprising:
 a computer comprising a processor connected to memory storing computer-implemented language processing software comprising:
 a network of associations comprising base words and related words, wherein the network of associations comprises respective data structures that associate the base words and the related words according to domains of words, wherein the respective data structures store parent-child relationship definitions, functions-like relationship definitions, and statistical measures of relationships between the base words and the related words;
 a user interface connected to the computer and configured to receive natural language inputs and to provide responses from the computer using the language processing software, wherein the language processing software implements a method comprising the steps of:
 identifying at least one base word in a respective natural language input;
 identifying at least one of the related words in the network as at least one target word relative to the base word from the natural language input;
 using the parent-child relationship definitions in the network of associations, identifying relationship structures between the at least one target word and the at least one base term;
 identifying respective functions-like phrases associated with the at least one base term in the natural language input and comparing the respective functions-like phrases with the functions-like relationship definitions in the network of associations;
 using the parent-child relationship definitions and the functions-like relationship definitions to calculate the statistical measures of relationships between the at least one base term and respective target words in the network of associations;
 weighting the statistical measures of relationships;
 identifying a probability that a respective domain of words exhibits shared features between the base word and the respective target words to an extent that the base word is a prototype within the domain of words; and
 computing a response with terms from the respective domain of words.

2. The computerized system of claim 1, further comprising a step of calculating a similarity vector between base words in the natural language input, the functions-like phrases and target words in the respective domain of words.

3. The computerized system of claim 2, wherein the functions-like phrases identify the base term relative to at least one of an action term from the natural language input, an object of the action term, a subject term from the natural language input, or the subject term performing the action term.

4. The computerized system of claim 2, further comprising narrowing down at least one previously defined language domain by identifying common terms in the respective natural language input and the respective domain of words.

5. The computerized system of claim 1, further comprising parsing the natural language inputs and extracting respective base words and/or clauses.

6. The computerized system of claim 1, wherein the network of associations is a multi-dimensional model.

\* \* \* \* \*